L. RASCH.
CENTRIFUGAL MACHINE.
APPLICATION FILED JAN. 23, 1918.
1,304,905.
Patented May 27, 1919.
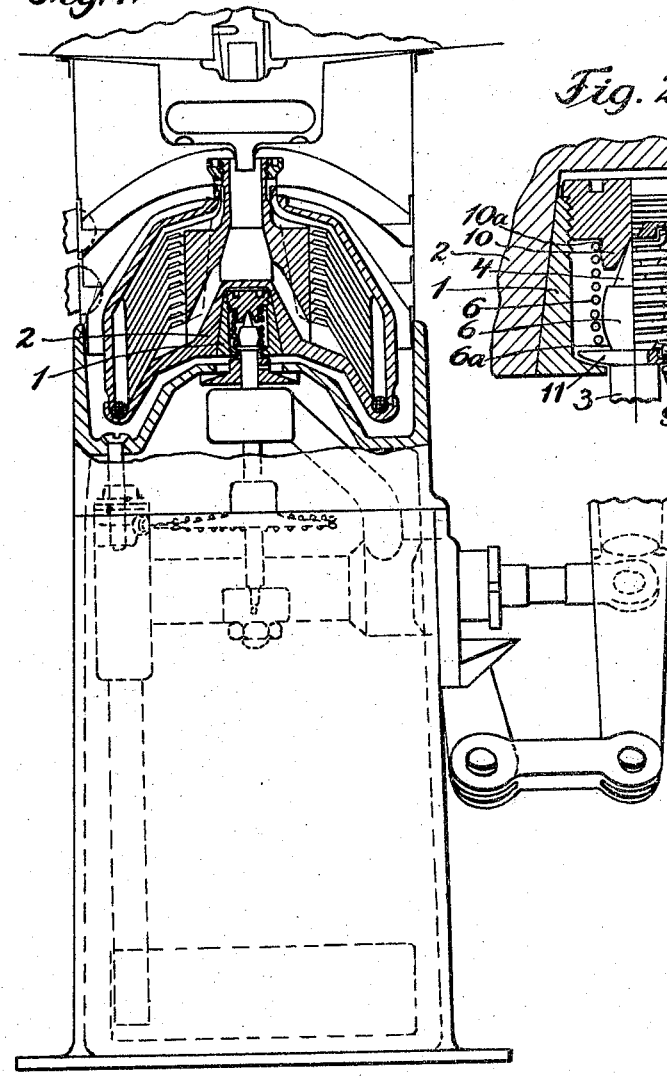
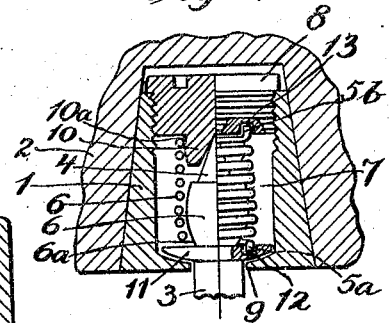

UNITED STATES PATENT OFFICE.

LUDVIK RASCH, OF CHRISTIANIA, NORWAY.

CENTRIFUGAL MACHINE.

1,304,905. Specification of Letters Patent. Patented May 27, 1919.

Application filed January 23, 1918. Serial No. 213,435.

*To all whom it may concern:*

Be it known that I, LUDVIK RASCH, a subject of the King of Norway, residing at Christiania, Norway, have invented certain new and useful Improvements in Centrifugal Machines, of which the following is a full and clear specification, with reference to the appended drawing.

The present invention relates to centrifugal machines that is machines having a body supported on a vertical spindle rotating with high speed. As said body may not be balanced it is essential that the joint between the body and the spindle shall work with least possible friction so that the body shall have full freedom to adjust itself and assume a position relative the spindle so that its center of gravity is located in the axis of rotation (the perpendicular through the foot point of the spindle). For this purpose the body is supported on the pointed end of the spindle and the means of transmission of rotation from the spindle to the body should work with the least possible friction.

An embodiment of my invention as applied to a milk separator is illustrated on the appended drawing, where Figure 1 represents the centrifugal separator with the upper portion in section, and Fig. 2 is enlarged view of the universal joint, partly in section.

The joint comprises a cone 1 serving as a seat for the drum 2. The spindle 3 is pointed at 4 and the cone 1 has a corresponding cavity, which is of sufficient width so as to allow the drum to assume a position with its axis at an angle to the axis of the spindle. The means for transmitting rotation from the spindle to the drum consists of a coilspring 5 the ends of which are attached to the cone 1 and to the spindle 3. In the preferred construction the spindle is provided with an enlargement 6 serving as a kind of guide for the spring 5, and the cone 1 is hollow to form a chamber 7 for said enlargement, said chamber being closed by a screw-plug 8 and the bottom of said chamber having an opening 9 for the spindle 3. The plug 8 is provided with a projection 10 serving as a guide for the spring 5. For the sake of convenient attachment of the spring 5 the spindle 3 is provided with a flange or collar 11, which has a recess 12 for the hooked end $5^a$ of the spring, whereas the plug 8 has a recess 13 for the hooked end $5^b$ of the spring 5. In order to make the spring 5 keep the parts (the cone 1 and the spindle) together the enlargement 6 and the projection 10 are reduced at $6^a$ and $10^a$ respectively and by having the coils of the spring 5 wound in the direction of rotation of the spindle the spring will be tightened against said reduced portions $6^a$ and $10^a$ and thus exert a slight pull on the parts against each other and yet allow the drum to adjust itself relative the spindle.

Trials have proved that the above described arrangement works quite satisfactorily, the drum running easy, without vibrations, even if it be very much unbalanced.

Having now described my invention, what I claim is:

In centrifugal machines the connecting joint comprising the rotation body and the spindle the said body being supported on the pointed end of the spindle and means of transmission of rotation from the spindle to the said body consisting of a coil spring having its ends attached to the spindle and to the body substantially as and for the purpose described.

In testimony whereof I affix my signature in presence of two witnesses.

LUDVIK RASCH.

Witnesses:
C. FABRICIUS-HANSEN,
C. FORMAN.

Copies of this patent may be obtained for five cents each, by addressing the "Commissioner of Patents, Washington, D. C."